US011005923B2

(12) United States Patent
Devanneaux et al.

(10) Patent No.: US 11,005,923 B2
(45) Date of Patent: May 11, 2021

(54) PROXY SERVER SELECTION BASED ON SERVER LATENCY TIMES

(71) Applicant: Apple Inc., Cupertino, CA (US)

(72) Inventors: Thomas P. Devanneaux, Los Altos, CA (US); Jose A. Lozano Hinojosa, Santa Clara, CA (US); Aniket A. Zamwar, Milpitas, CA (US); Thuy Park, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/425,873

(22) Filed: May 29, 2019

(65) Prior Publication Data

US 2020/0382580 A1    Dec. 3, 2020

(51) Int. Cl.
*H04L 29/08* (2006.01)
*H04L 12/18* (2006.01)
*G06N 20/00* (2019.01)

(52) U.S. Cl.
CPC ........... *H04L 67/101* (2013.01); *G06N 20/00* (2019.01); *H04L 12/1827* (2013.01); *H04L 67/28* (2013.01)

(58) Field of Classification Search
USPC ....................................................... 709/238
See application file for complete search history.

(56) References Cited

U.S. PATENT DOCUMENTS

| | | | |
|---|---|---|---|
| 8,427,958 | B2 | 4/2013 | Ko et al. |
| 8,433,787 | B2 | 4/2013 | Garcia-Luna-Aceves et al. |
| 2011/0267952 | A1* | 11/2011 | Ko .................. H04L 45/70 370/237 |
| 2013/0311674 | A1* | 11/2013 | Garcia-Luna-Aceves ............. H04L 29/12009 709/241 |
| 2015/0271280 | A1 | 9/2015 | Zhang et al. |
| 2016/0285948 | A1* | 9/2016 | Saint-Hilaire ........ H04L 65/608 |
| 2019/0007503 | A1 | 1/2019 | Zmijewski et al. |
| 2020/0092181 | A1* | 3/2020 | Thiagarajan .......... H04L 45/121 |

* cited by examiner

*Primary Examiner* — Hermon Asres
(74) *Attorney, Agent, or Firm* — Morgan, Lewis & Bockius LLP

(57) ABSTRACT

A device implementing a system for proxying data between devices includes a processor configured to obtain a first latency and a second latency, the first latency being between a server and a first subnet, and the second latency being between the server and a second subnet. The at least one processor is further configured to train a machine learning model with a training dataset that includes the first latency with respect to the server and the first subnet, the second latency with respect to the server and the second subnet, and geographic data of the server, the first subnet and the second subnet. The at least one processor is further configured to use the machine learning model to estimate a third latency between the server and a third subnet, and store the first, second and third latencies in a data structure.

20 Claims, 7 Drawing Sheets

PROXY SERVER SELECTION BASED ON SERVER LATENCY TIMES

TECHNICAL FIELD

The present description relates generally to proxying data between devices, including selecting a server to proxy data between multiple devices.

BACKGROUND

A proxy server may be configured to proxy data between multiple devices. For example, a sending device may send data to a receiving device via the proxy server.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
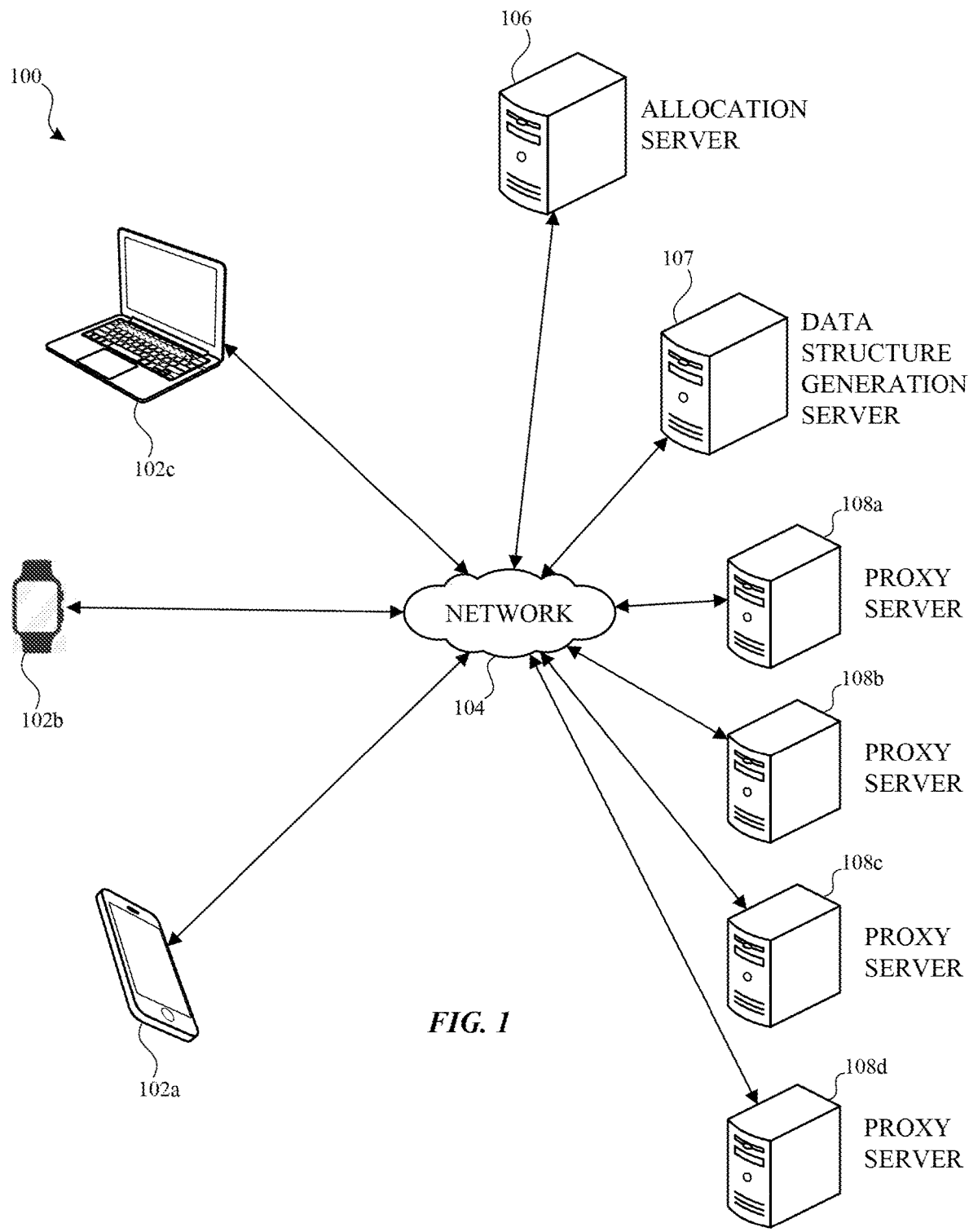
FIG. 1 illustrates an example network environment for selecting a server to proxy data between multiple devices in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Proxy servers may proxy data communicated between a device and one or more other devices. In some instances, a proxy server may act as a proxy for a group of devices, e.g., a proxy server may proxy data transmitted by a first device to a second and third device, the proxy server may proxy data transmitted by the second device to the first and third devices, and the proxy server may proxy data transmitted by the third device to the first and second devices. For example, in audio-video conferencing, a single proxy server may be used to proxy audio and/or video data communicated between multiple participant devices. However, two or more of the participant devices may be located in different geographical regions (e.g., continents, countries, states and/or cities), and therefore multiple different candidate proxy servers in multiple different geographical regions may be available to proxy the audio and/or video data communicated between the devices.

The subject system provides for selecting a proxy server, from among the multiple candidate proxy servers, for proxying data communicated between multiple devices. The selection of the proxy server may be based on minimizing or otherwise reducing the latency for proxying/communicating data between the multiple devices.

The subject system provides for estimating latencies between devices (e.g., each of which is connected to a respective subnet) and proxy servers. The subject system may estimate a latency for each combination of subnet and proxy server, and store each respective estimated latency in a data structure for lookup. Thus, in response to a request for proxying data between multiple devices, a server (e.g., an allocation server which may have access to the stored data structure) may look up the estimated latencies between subnets and candidate proxy servers. The allocation server may select a proxy server based on lowest estimated total latency.

The data structure storing the latencies for the different combinations of subnets and proxy servers may be populated in different manners. For example, prior latency measurements (e.g., round trip times) between a particular subnet and proxy server combination may be used to determine the estimate for the latency, such as by averaging (e.g., determining a mean value of, or a median value of) the prior latency measurements. In a case where prior latency measurements are unavailable or otherwise insufficient (e.g., due to being below a predefined minimum number of measurements), a machine learning model may be used to predict the latency measurement. For example, the machine learning model may have been trained with a dataset that includes the prior measured latencies of other subnet and proxy server combinations (e.g., together with their respective geographic locations), in order to predict the latency of a different subnet and proxy server combination (e.g., with known geographic locations).

By virtue of generating and storing a data structure which provides for lookup of estimated latency between a subnet and a proxy server, it is possible to quickly select a proxy server in response to a request for proxying data communicated between multiple devices. In addition, the selected server may provide for reduced latency while proxying the data, e.g., relative to the other candidate proxy servers.

FIG. 1 illustrates an example network environment for selecting a server to proxy data between multiple devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102a-102c, a network 104, an allocation server 106, a data structure generation server 107 and proxy servers 108a-108d. The network 104 may communicatively (directly or indirectly) couple, for example, any two or more of the electronic devices 102a-102c, the allocation server 106, the data structure generation server 107 and the proxy servers 108a-108d. In one or more implementations, the network 104 may be an interconnected network of devices that may include, and/or may be communicatively coupled to, the Internet. For explanatory purposes, the network environment 100 is illustrated in FIG. 1 as including electronic devices 102a-102c, a single allocation server 106, a single data structure generation server 107 and the proxy servers 108a-108d; however, the network environment 100 may include any number of electronic devices, allocation servers and/or proxy servers. Furthermore, in one or more implementations, one or more of the proxy servers 108a-108d may include the allocation server 106 and/or the data structure generation server 107.

One or more of the electronic devices 102a-102c may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102a is depicted as a smartphone, the electronic device 102b is depicted as a laptop computer, the electronic device 102c is depicted as a smartwatch, and the electronic device 105 is depicted as a smart speaker.

The electronic devices 102a-102c may be configured to communicate or otherwise interact with the allocation server 106. For example, the electronic device 102a may initiate an audio-video conference between the electronic devices 102a-102c. Thus, the electronic device 102a may send a request to the allocation server 106 for proxying data communicated between the electronic devices 102a-102c. The allocation server may select one of the proxy servers 108a-108d (e.g., corresponding to candidate proxy servers) for the proxying, for example, based on summations of estimate latencies between each the electronic devices 102a-102c (e.g., or their connected subnets) and the respective proxy servers 108a-108d as described herein.

After a particular proxy server is selected (e.g., the proxy server 108a), the proxy server 108a may provide for proxying data between the electronic devices 102a-102c (e.g., for audio-video conferencing). Each of the electronic devices 102a-102c may be, and/or may include all or part of, the device discussed below with respect to FIG. 2, and/or the electronic system discussed below with respect to FIG. 7.

Each of the allocation server 106, the data structure generation server 107 and/or the proxy servers 108a-108d may be, and/or may include all or part of the device discussed below with respect to FIG. 2, and/or the electronic system discussed below with respect to FIG. 7. Each of the allocation server 106, the data structure generation server 107 and/or the proxy servers 108a-108d may include one or more servers, such as a cloud of servers. For explanatory purposes, for each of the allocation server 106, the data structure generation server 107 and the proxy servers 108a-108d, a single server is shown with respect to various operations. However, these and other operations discussed herein may be performed by one or more servers, and each different operation may be performed by the same or different servers.

Figure 2:
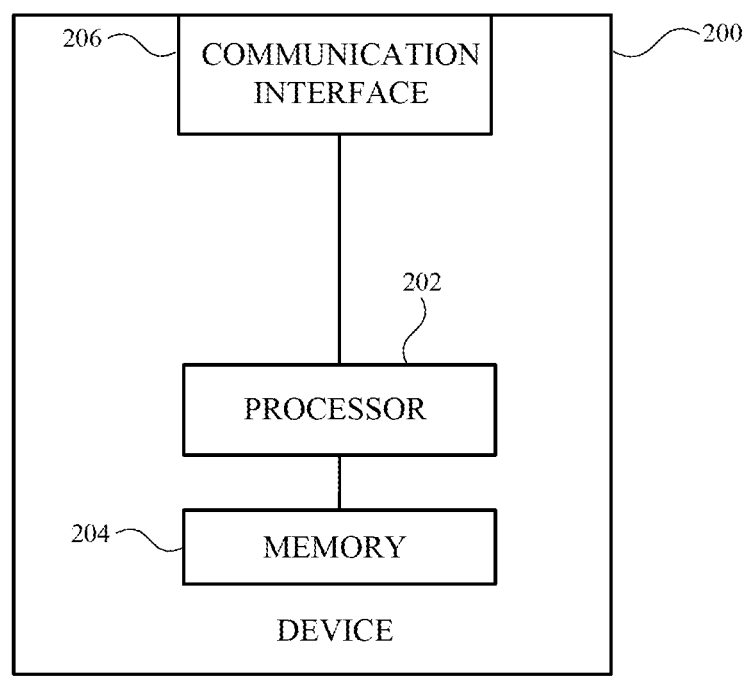
FIG. 2 illustrates an example device that may implement a system used in the selection of a server to proxy data between multiple devices in accordance with one or more implementations.

FIG. 2 illustrates an example device 200 that may implement a system used in the selection of a server to proxy data between multiple devices in accordance with one or more implementations. For example, the device 200 of FIG. 2 can correspond to any of the electronic devices 102a-102c, the allocation server 106, the data structure generation server 107 and/or the proxy servers 108a-108d of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, and a communication interface 206. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102a-102c, the memory 204 may store an application (e.g., an audio-video conferencing application) which is configured to transmit and/or receive data via a proxy server (e.g., one of the proxy servers 108a-108d). In one or more implementations, the audio-video conferencing application may be part of or otherwise incorporated within the operating system of the electronic devices 102a-102c.

In one or more implementations, in a case where the device 200 corresponds to one or more of the proxy servers 108a-108d, the memory 204 may store one or more components configured to work in conjunction with the above-mentioned device application (e.g., the audio-video conferencing application), to facilitate in proxying data (e.g., audio and/or video data) between the electronic devices 102a-102c.

In one or more implementations, in a case where the device 200 corresponds to the allocation server 106, the memory 204 may store one or more components configured to receive a request (e.g., from the electronic device 102a) for proxying data between the electronic devices 102a-102c (e.g., for audio-video conferencing). The allocation server 106 may select one of the proxy servers 108a-108d (e.g., based on a data structure generated by the data structure generation server 107), and may facilitate in initiating the proxying of data for the electronic devices 102a-102c via the selected proxy server (e.g., the proxy server 108a).

The communication interface 206 may include suitable logic, circuitry, and/or code that enables wired or wireless communication, such as between any of the electronic devices 102a-102c, the allocation server 106, the data structure generation server 107 and/or the proxy servers 108a-108d over the network 104. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
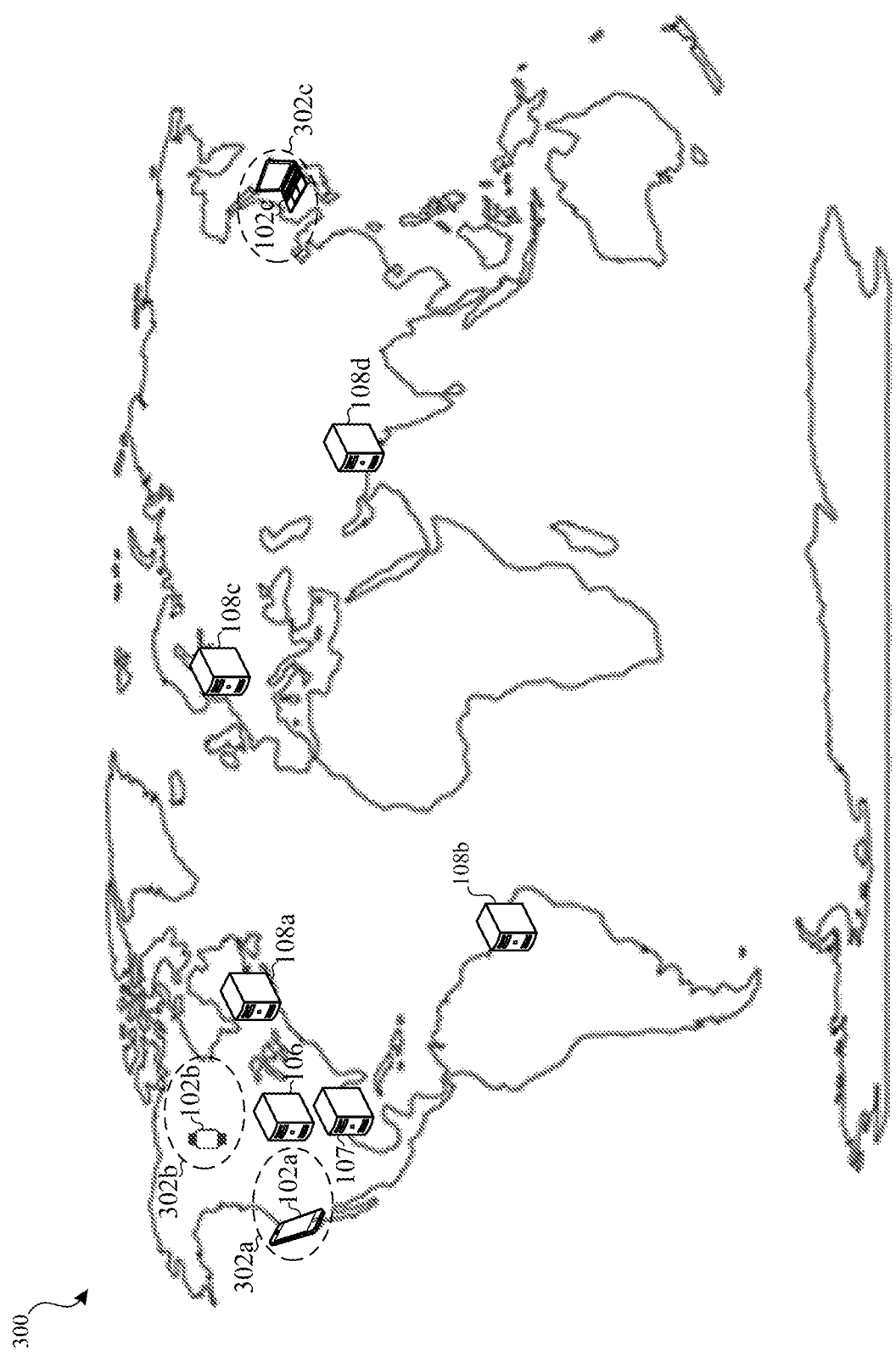
FIG. 3 illustrates an example environment in which the subject system for selecting a server to proxy data between multiple devices may be implemented, in accordance with one or more implementations.

FIG. 3 illustrates an example environment 300 in which the subject system for selecting a server to proxy data between multiple devices may be implemented, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

A proxy server may assist in reducing redundant transmission of data by an electronic device. For example, in a case where three or more devices are transmitting data between each other (e.g., as part of an audio-video conference), peer-to-peer communication between the participating devices may result in a sending device transmitting similar data to each of the receiving devices. In the example of FIG. 3, the sending device (e.g., the electronic device 102a) may separately transmit data (e.g., audio and/or video data) to each of the receiving devices (e.g., the electronic devices 102b-102c). In one or more implementations, even in peer-to-peer communication, connecting to a proxy server is required to bootstrap the peer-to-peer connection. As such, the sending device (e.g., the electronic device 102a) will connect to the proxy server prior to establishing peer-to-peer communication. Thus, selection of a proxy server a described herein may result in reduced latency, even in cases of peer-to-peer communication.

However, if a proxy server (e.g., the proxy server 108a) is used, the sending device (e.g., the electronic device 102a) may transmit data once to the proxy server, which in turn may proxy the data to each of the receiving devices (e.g., the electronic devices 102b-102c). Thus, in a case where three or more electronic devices are communicating with each other (e.g., as part of an audio-video conference), use of the proxy server may assist in reducing the retransmission of data by the sending device.

The subject system provides for an allocation server 106 to select a proxy server, from among the proxy servers 108a-108d, for proxying data between the electronic devices 102a-102c. In making the selection, the allocation server 106 may estimate which of the proxy servers 108a-108d results in the lowest estimated latency times (e.g., round trip times) for proxying data between the electronic devices 102a-102c. Such estimates may be determined based on a data structure generated by the data structure generation server 107.

The environment 300 includes the electronic devices 102a-102c, the allocation server 106, the data structure generation server 107 and the proxy servers 108a-108d. Moreover, the environment 300 includes subnets 302a-302c. For explanatory purposes, the environment 300 is illustrated as including three electronic devices 102a-102c, three subnets 302a-302c, one allocation server 106, one data structure generation server 107 and four proxy servers 108a-108d of FIG. 1. However, the environment 300 may include any number of electronic devices, subnets, allocation servers, data structure generation servers and/or proxy servers.

In one or more implementations, each of the subnets 302a-302c corresponds to a logical subdivision of an IP network, where the connected devices are addressed with an identical bit-group (e.g., most-significant bit-group) in their IP addresses. In this manner, the subnet to which a device is connected may represent a general location of the device. As shown in the example of FIG. 3, the electronic devices 102a-102c are respectively connected to the subnets 302a-302c. Moreover, the locations of the electronic devices 102a-102c are illustrated as generally corresponding to those of the respective subnets 302a-302c.

Moreover, each of the proxy servers 108a-108d may correspond to a respective point of presence (POP). For example, a POP may correspond to an access point on the Internet. A POP may hold multiple servers, routers and/or other interface equipment for connecting to the Internet, and may be physically located within a data center. In this regard, the proxy servers 108a-108d as described herein may refer to a respective POP.

In the example of FIG. 3, each of the electronic devices 102a-102c, the subnets 302a-302c, the allocation server 106, the data structure generation server 107 and the proxy servers 108a-108d are illustrated as being positioned at different example geographical locations, where the different geographical locations span multiple continents and countries. However, it is possible for one or more of the electronic devices 102a-102c, the subnets 302a-302c, the allocation server 106, the data structure generation server 107 and/or the proxy servers 108a-108d to be positioned in similar geographical locations (e.g., countries, states, cities or the like), or a combination of similar and different geographical locations. Moreover, it is possible for the electronic devices 102a-102c, the subnets 302a-302c, the allocation server 106, the data structure generation server 107 and the proxy servers 108a-108d to be positioned in a shared larger geography (e.g., in the same country), and/or different but smaller geographies (e.g., in different states, cities or the like).

Figure 4:
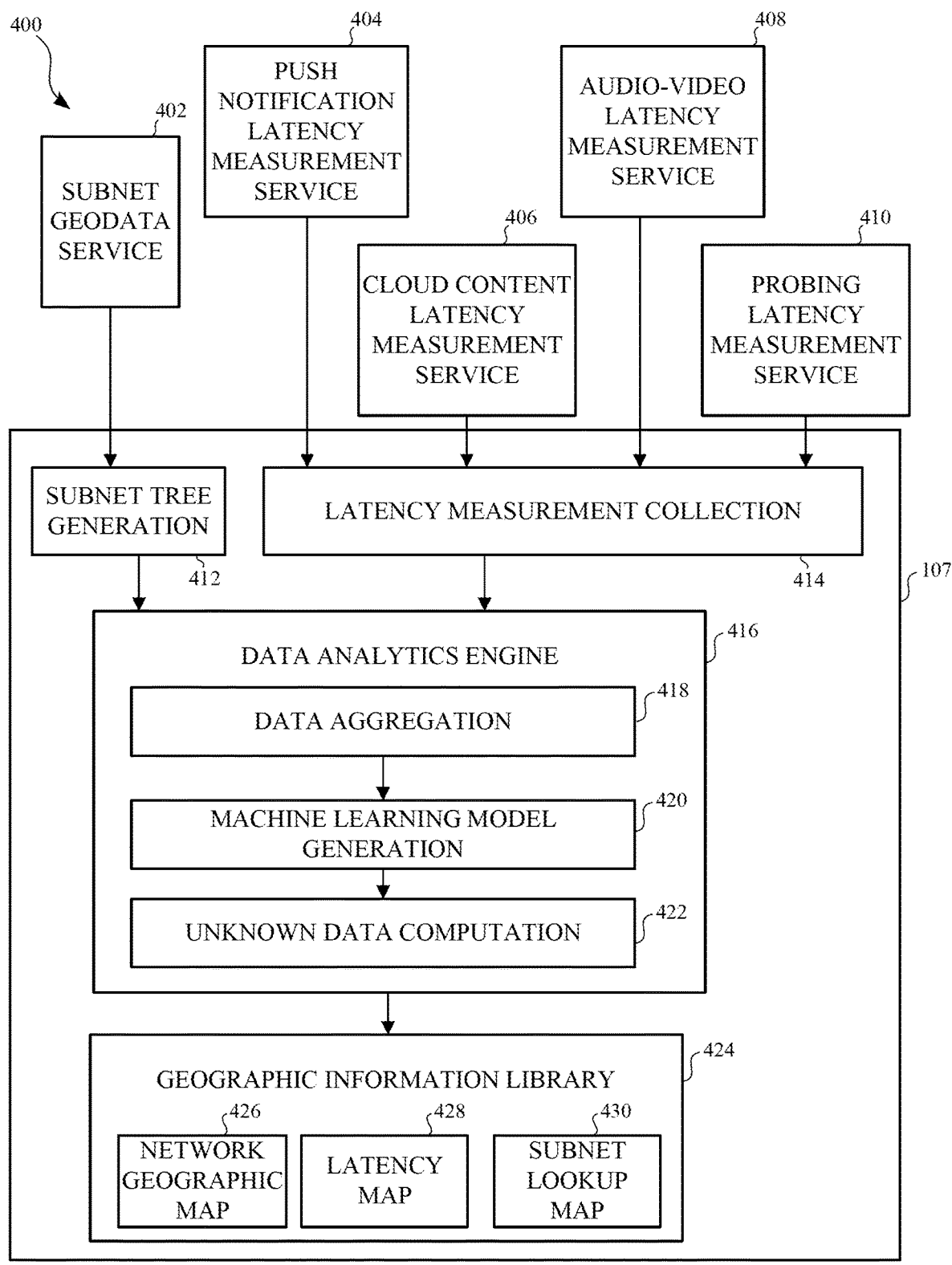
FIG. 4 illustrates an example architecture of a system for generating a data structure used to select a server to proxy data between multiple devices in accordance with one or more implementations.

FIG. 4 illustrates an example architecture 400 of a system for generating a data structure used to select a server to proxy data between multiple devices in accordance with one or more implementations. For explanatory purposes, FIG. 4 is primarily described herein with reference to the data structure generation server 107 of FIG. 1. However, FIG. 4 is not limited to the data structure generation server 107 of FIG. 1, and one or more other components and/or other suitable devices may be used instead.

The data structure generation server 107 may implement a subnet tree generation module 412 and a latency measurement collection module 414. The data structure generation server 107 may further implement a data analytics engine 416, including a data aggregation module 418, a machine learning model generation module 420, and an unknown data computation module 422. In addition, the data structure generation server 107 may implement a geographic information library 424, including a network geographic map 426, a latency map 428 and a subnet lookup map 430. The subnet tree generation module 412, the latency measurement collection module 414, the data analytics engine 416 (including modules 418-422) and/or the geographic information library 424 (including maps 426-430) may be implemented by one or more software modules running on the processor 202 of the data structure generation server 107. In another example, the subnet tree generation module 412, the latency measurement collection module 414, the data analytics engine 416 (including modules 418-422) and/or the geographic information library 424 (including maps 426-430) may be implemented by custom hardware (e.g., one or more coprocessors) configured to execute respective functions.

FIG. 4 further illustrates a subnet geodata service 402, a push notification latency measurement service 404, a cloud content latency measurement service 406, an audio-video latency measurement service 408 and a probing latency measurement service 410. The services 402-410 may be implemented by one or more respective servers, for example, which may be co-located with the proxy servers 108a-108d. Not all of the components depicted in FIG. 4 may be used in all implementations, and one or more implementations may include additional or different components than those shown in the figure. Variations in the arrangement and type of the components may be made without departing from the spirit or scope of the claims as set forth herein. Additional components, different components, or fewer components may be provided.

As noted above, the data structure generation server 107 may be configured to select a particular proxy server (e.g., from among the proxy servers 108a-108d) based on estimated latency times between subnets (e.g., the subnets 302a-302c) and proxy servers (e.g., the proxy servers 108a-108d). For example, a data structure (e.g., the geographic information library 424) may be generated to provide these estimated latency times. The data structure may provide an indication of estimated latency time (e.g., round trip time) for each combination of subnet and proxy server.

In the example of FIG. 4, the data structure generation server 107 generates the data structure, and provides the data structure to the allocation server 106. However, in one or more implementations, the allocation server 106 may itself generate the data structure (e.g., such that the data structure generation server 107 is included as part of the allocation server 106). The allocation server 106 may store the generated data structure (e.g., the geographic information library 424) locally in memory (e.g., the memory 204 of the allocation server 106) and use the data structure to select a proxy server.

Several components may be used to generate the data structure (e.g. the geographic information library 424). For example, the subnet tree generation module 412 may be configured to generate subnet tree(s) which map the IP addresses for devices (e.g., the electronic devices 102a-102c) to respective subnets (e.g., the subnets 302a-302c), and which provide geographic data for the subnets. Further, the latency measurement collection module 414 may be configured to collect latency information from multiple sources (e.g., the services 404-410). In addition, the data analytics engine 416 may be configured to access the generated subnet tree(s) and the collected latency data, to aggregate latency times (e.g., prior measurements) for multiple combinations of subnets and proxy servers. In a case where there may be unknown latencies for particular combination(s) of subnets and proxy servers, the data analytics engine 416 may further be configured to generate a machine learning model for predicting the unknown latencies.

With respect to the subnet tree generation module 412, this module may be configured communicate with the subnet geodata service 402. The subnet geodata service 402 may provide geographic data related to subnets (e.g., the subnets 302a-302c) including, but not limited to, country, city, GPS coordinates, network type, bandwidth, list of domains, ISPs and the like. In one or more implementations, the geographic data may be updated on a periodic basis (e.g., every 30 minutes), and can be pushed to and/or fetched by the subnet tree generation module 412 to create one or more subnet trees.

In one or more implementations, the subnet tree(s) may correspond to classless inter-domain routing (CIDR) trees, for example, which provide for allocating IP addresses and for IP routing based on the most significant bits of IP addresses (e.g., corresponding to the electronic devices 102a-102c). For each subnet (e.g., which may correspond to the general location of a connected device), the subnet tree(s) may provide geographic data and/or other data for the subnet (e.g., country, city, GPS coordinates, network type, bandwidth, list of domains, ISPs), based on the information received from (e.g., on a periodic basis) the subnet geodata service 402. The subnet tree(s) may correspond to the maps 426-430 discussed further below.

Regarding the latency measurement collection module 414, this module may be configured to communicate with multiple sources that provide latency measurement data. The multiple services may include, but are not limited to, the push notification latency measurement service 404, the cloud content latency measurement service 406, the audio-video latency measurement service 408 and/or the probing latency measurement service 410.

In one or more implementations, the push notification latency measurement service 404 may provide latency measurements associated with push notifications. For example, one or more of the electronic devices 102a-102c may connect to courier server(s) (e.g., co-located with the proxy servers 108a-108d and/or respective POPs) that facilitate the transmission of push notifications to applications running on the respective electronic devices 102a-102c. The corresponding courier protocol may provide latency measurements (e.g., round trip times) for connecting to and/or disconnecting from the courier service(s). Examples of latency measurements (e.g., round trip times) include, but are not limited to, the kernel TCP, downlink from a device's push notification acknowledgment and/or uplink from a device's messaging client. In one or more implementations, these latency measurements may be updated on a periodic basis (e.g., daily as part of log data), and can be pushed to and/or fetched by the latency measurement collection module 414 on a periodic basis and/or as updates become available.

In one or more implementations, the cloud content latency measurement service 406 may provide latency measurements associated with connecting to cloud-based content (e.g., user account content stored in the cloud). For example, one or more of the electronic devices 102a-102c may be connected to cloud-based content server(s) (e.g., co-located with the proxy servers 108a-108d and/or respective POPs) that facilitate the transmission of cloud-based content to applications running on the respective electronic devices 102a-102c. The cloud content latency measurement service 406 may provide for latency measurements (e.g., round trip times) for TCP and/or SSL connections between the device(s) and cloud-based content server(s). In one or more implementations, these latency measurements may be updated on a periodic basis (e.g., daily as part of log data), and can be pushed to and/or fetched by the latency measurement collection module 414 on a periodic basis and/or as updates become available.

In one or more implementations, the audio-video latency measurement service 408 may provide latency measurements associated with audio-video conferencing. For example, one or more of the electronic devices 102a-102c may be connected to server(s) (e.g., co-located with the proxy servers 108a-108d and/or respective POPs) that facilitate the transmission of audio-video content for conferencing between the electronic devices 102a-102c. The audio-video latency measurement service 408 may provide for latency measurements (e.g., round trip times) corresponding to the audio-video content transmitted between the device(s). In one or more implementations, these latency measurements may be updated on a periodic basis (e.g., daily as part of log data), and can be pushed to and/or fetched by the latency measurement collection module 414 on a periodic basis and/or as updates become available.

In one or more implementations, the probing latency measurement service 410 may provide latency measurements associated with probe requests that are sent by device(s) (e.g., the electronic device 102a-102c) to one or more servers (e.g., co-located with the proxy servers 108a-108d and/or respective POPs). For example, the probe requests may be sent in association with a user of a device querying (e.g., via a voice query) a virtual assistant application running on his/her device. Separate from handling the voice query, the virtual assistant program may, at predefined intervals (e.g., once every 10 queries), send a probe request to a particular and/or random proxy server, in order to obtain a latency measurement (e.g., round trip time) for device connection to that proxy server. Thus, if one or more of the proxy servers 108a-108d may not have sufficient latency measurements for a particular subnet, the probe request may be sent to obtain such latency measurements (e.g., for more comprehensive latency measurement data). The probing latency measurement service 410 may further be configured to determine which proxy server(s) should be probed (e.g., based on the amount of latency data for the proxy server).

Thus, the subnet tree generation module 412 and the latency measurement collection module 414 may be configured to receive data from multiple services (e.g., the services 402-410), and the received data may be provided to the data analytics engine 416. The data analytics engine 416 may be used to generate the data structure (e.g., the geographic information library 424) based on the received data.

The data analytics engine 416 may include a data aggregation module 418, configured to aggregate latency times for each of the multiple combinations of subnets and proxy servers. However, there may be cases where latency measurements are not provided and/or otherwise known with respect to particular combinations of subnets and proxy servers. Thus, the data analytics engine 416 may further include a machine learning model generation module 420, which is configured to generate a machine learning model for predicting the unknown latencies. The unknown data computation module 422 may use the generated machine learning model to determine the unknown latency measurements.

With respect to the data aggregation module 418, this module may generate histograms with prior latency measurements for combinations of subnets, proxy servers and latency measurement sources. As noted above, the latency measurement collection module 414 may have received the latency measurements from multiple sources (e.g., one or more of the services 404-410). The data aggregation module 418 may generate a respective histogram that aggregates each subnet and proxy server combination (e.g., where the combinations include: subnet 302a-proxy server 108a, 302a-108b, 302a-108c, 302a-108d; 302b-108a, . . . , 302-108d; and 302c-108a, . . . , 302c-108d) for each latency measurement source. Each bin in the histogram(s) may correspond to a different range of latency values.

For each combination of subnet and proxy server, the data aggregation module 418 may compute a separate histogram for each latency measurement source (e.g., as provided by the services 404-410), including but not limited to: kernel TCP info, uplink, download, TCP and/or SSL connections. For each histogram, round trip time ("RTT") values may be provided into a respective bin, where each bin has a range of possible RTT values (e.g., see Table 1 below). As the bin number increases, the value range may increase exponentially. In the example of Table 1, 64 bins are used in total. As shown in the example of Table 1, an RTT value of 4 ms is categorized into bin index 1, where a RTT of 40 ms is categorized into bin index 7.

TABLE 1

| Bin index | 1 | 2 | 3 | 4 | 5 | 6 | 7 | 8 | 9 | 10 | ... | 64 |
|---|---|---|---|---|---|---|---|---|---|---|---|---|
| RTT range in ms | 0 | 5 | 10 | 16 | 22 | 29 | 36 | 43 | 51 | 60 | ... | 5000 |
| Value as count of RTTs recorded | 0 | 56 | 25 | 126 | 231 | 134 | 21 | 5 | 0 | 1 | ... | 0 |

As such, each histogram may represent a measurement for a specific combination of a subnet, a proxy server and a latency data source type (e.g., as provided by the services 404-410). In one or more implementations, data aggregation is performed with respect to latency measurements of varying times (e.g., or ages). Latency measurements that exceed a certain age (e.g., more than 30 days old) may be discarded, such that the data aggregation includes more recent data (e.g., data measured in within the past few days).

Moreover, a minimum count of latency measurements may be required for each histogram. For example, for a given combination of subnet and proxy server, the data aggregation module 418 may require at least five latency measurements from the push notification latency measurement service 404 (e.g., corresponding to one latency measurement source), and may require twenty latency measurements from the cloud content latency measurement service 406 (e.g., corresponding to another latency measurement source) in order to generate respective histograms. If the minimum number of latency measurements is not met, the respective histogram (e.g., for the subnet, proxy server and latency data source type) may be disregarded, for improved data population density.

In one or more implementations, a median value may be determined for each histogram. For a given combination of subnet and proxy server, the smallest median value determined from among the histograms (e.g., corresponding to respective latency measurement sources) may be used as the latency measurement for that subnet-proxy server combination. In one or more implementations, a mean value (with smallest mean value) may be used instead of the above-mentioned median value (with smallest median value). Thus, the data aggregation module 418 is configured to generate histograms, which may be used to provide an estimated latency measurement for subnet and proxy server combinations having prior (e.g., known) latency measurements.

As noted above, latency measurements may not be known for some combinations of subnet and proxy server (e.g., corresponding to blank and/or disregarded entries in the histogram(s)). As such, the machine learning model generation module 420 may generate a machine learning model configured to predict latency measurements where there is insufficient latency measurement data. In one or more implementations, latency measurement data may be insufficient in cases where there is fewer than the required minimum number of corresponding datasets as noted above.

In one or more implementations, the machine learning model may be generated and/or trained with input parameters including, but not limited to: country code; geographical subdivision code; geographical city; continent code; an indicator of whether the subnet and proxy server reside in the same country; an indicator of whether the subnet and proxy server reside in the same continent; network type: mobile, cable, DSL and the like; network or ISP name; latitude; longitude; longitude as normalized; longitude as normalized; computed distance from the subnet to the proxy server; normalized distance; RTT from downlink (e.g., as provided by the push notification latency measurement service 404); RTT from uplink (e.g., as provided by the push notification latency measurement service 404); RTT from kernel TCP (e.g., as provided by the push notification latency measurement service 404); and RTT from cloud (e.g., as provided by the cloud content latency measurement service 406). In one or more implementations, the machine learning model may be trained using geographical data provided by the subnet tree (e.g., as generated by the subnet tree generation module 412 in conjunction with the subnet geodata service 402) and/or the latency measurements provided by the latency measurement collection module (e.g., in conjunction with the services 404-410).

After being trained, the machine learning model may be configured to receive a subset of the input parameters, e.g. the geographic data for a particular proxy server and/or subnet, in real-time. Based on the input parameters, the machine learning model may be configured to output an estimated latency between a subnet and a proxy server. The unknown data computation module 422 may use the generated machine learning model to obtain the unknown latency measurements (e.g., for the blank entries in the data structure).

Thus, the data analytics engine 416 is configured to provide estimated latency measurements between each of the subnets (e.g., the subnets 302a-302c) and proxy servers (e.g., the proxy servers 108a-108d). These estimates may correspond to prior (e.g., known) latency measurements associated with particular subnet and proxy server combinations, or may instead correspond to a predicted/estimated latency measurement as provided by a machine learning model.

The geographic information library 424 may correspond to the data structure which provides estimated latencies for subnet and proxy server combinations, together with geographic data associated with the subnets and/or proxy servers. The geographic information library 424 may provide this information by performing lookups for a particular IP address (e.g., of the electronic devices 102a-102c). For example, given an IP address, the subnet lookup map 430 may provide the closet subnet representation (e.g., which subnet the IP address is connected to). In addition, the network geographic map 426 may provide (e.g., via look up operation) geographical information such as county, city, ISP and the like (e.g., corresponding to a respective subnet). Moreover, for a given IP address, the latency map 428 may provide latency information such as estimated RTTs to each of the proxy servers 108a-108d (e.g., from a respective subnet).

As noted above, the geographic information library 424 may be generated by the data structure generation server 107 and provided to the allocation server 106. Alternatively or in addition, the geographic information library 424 may be generated by the allocation server 106. The allocation server 106 may store the geographic information library 424, and use the geographic information library 424 in selecting a proxy server (e.g., from among the plural proxy servers 108a-108d) for proxying data between the electronic devices 102a-102c.

In one or more implementations, one or more of the services 402-410, the subnet tree generation module 412, the latency measurement collection module 414, the data analytics engine 416 (including modules 418-422) and/or the geographic information library 424 (including maps 426-430) are implemented via software instructions, stored in memory, which when executed by respective processor(s), cause the processor(s) to perform particular function(s).

In one or more implementations, one or more of the one or more of the services 402-410, the subnet tree generation module 412, the latency measurement collection module 414, the data analytics engine 416 (including modules 418-422) and/or the geographic information library 424 (including maps 426-430) may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 5:
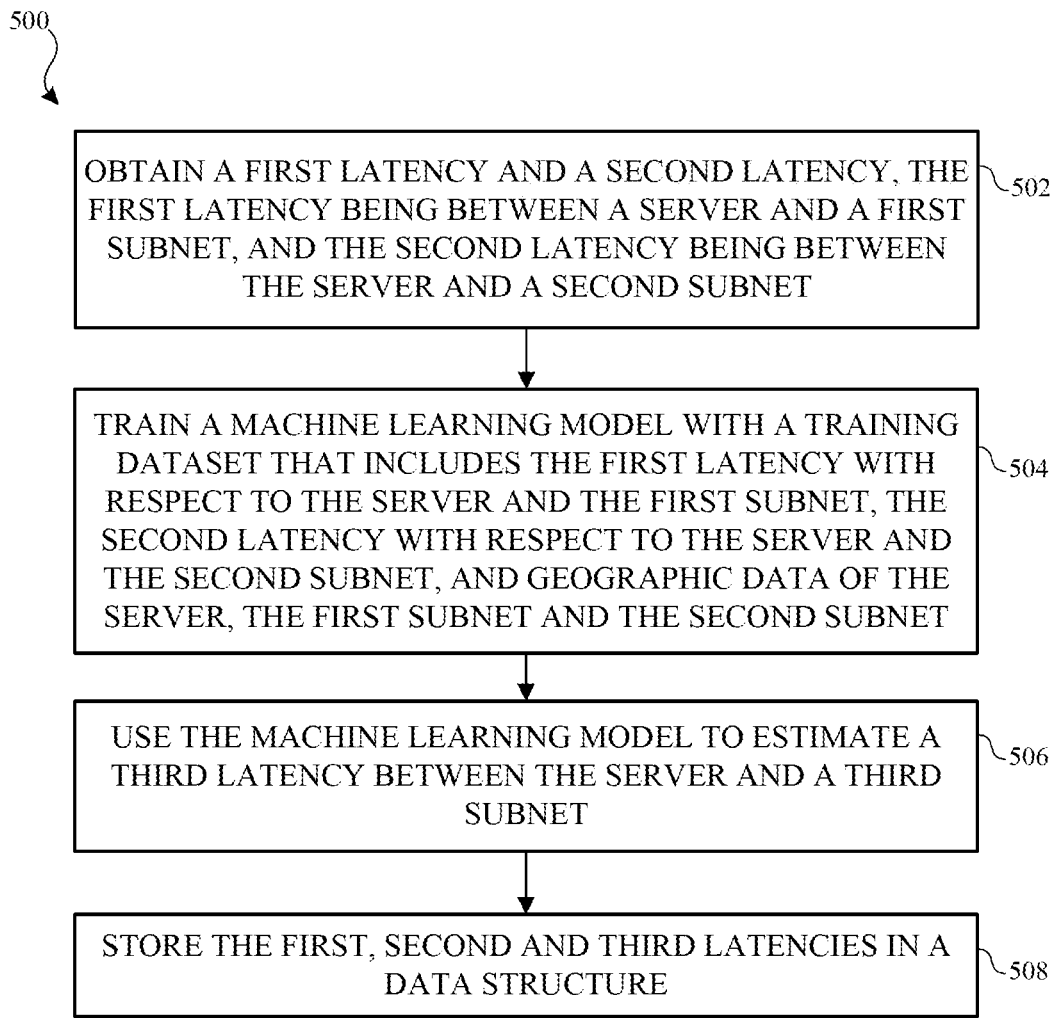
FIG. 5 illustrates a flow diagram of an example process for providing a data structure used to select a server to proxy data between multiple devices in accordance with one or more implementations.

FIG. 5 illustrates a flow diagram of an example process for providing a data structure used to select a server to proxy data between multiple devices in accordance with one or more implementations. For explanatory purposes, the process 500 is primarily described herein with reference to the electronic devices 102a-102c, the allocation server 106, the data structure generation server 107 and the server proxy server 108a of FIG. 1. However, the process 500 is not limited to the electronic devices 102a-102c, the allocation server 106, the data structure generation server 107 and the proxy server 108a of FIG. 1, and one or more blocks (or operations) of the process 500 may be performed by one or more other components and/or other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The data structure generation server 107 obtains a first latency and a second latency (502). The first latency is between the proxy server 108*a* and a first subnet (e.g., the subnet 302*a*, to which the electronic device 102*a* is connected). The second latency is between the proxy server 108*a* and a second subnet (e.g., the subnet 302*b*, to which the electronic device 102*b* is connected). For example, each of the first and second latencies may correspond to a round trip time between the proxy server 108*a* and the subnets 302*a*-302*b*, respectively.

The data structure generation server 107 trains a machine learning model with a training dataset that includes the first latency with respect to the proxy server 108*a* and the subnet 302*a*, the second latency with respect to the proxy server 108*a* and the subnet 302*b*, and geographic data of the proxy server 108*a*, the subnet 302*a* and the subnet 302*b* (504). In one or more implementations, the training dataset may include a significant number of additional latency measurements, as described above.

At operation 506, the data structure generation server 107 uses the machine learning model to estimate a third latency between the proxy server 108*a* and a third subnet (e.g., the subnet 302*c*, to which the electronic device 102*c* is connected). The machine learning model may be configured to estimate the third latency between the proxy server 108*a* and the subnet 302*c* based on an input dataset that includes, for example, geographic data of the subnet 302*c*.

The data structure generation server 107 stores the first, second and third latencies in a data structure (508). The data structure generation server 107 may also use the machine learning model to estimate a fourth latency between a second proxy server (e.g., the proxy server 108*b*) and one of the subnets 302*a*-302*c*, and store the fourth latency in a data structure. The allocation server 106 is configured to access the data structure.

The allocation server 106, may be configured to select the proxy server 108*a*, from among plural candidate proxy servers (e.g., 108*a*-108*d*), for proxying data between the electronic devices (e.g., 102*a*-102*c*) based on at least one of the first latency, the second latency, the third latency or the fourth latency stored in the data structure. For example, the allocation server 106 may be configured to select the proxy server 108*a*, from among the plural candidate proxy servers, in response to receiving a request for proxying data communicated between the electronic devices 102*a*-102*c*.

Figure 6:
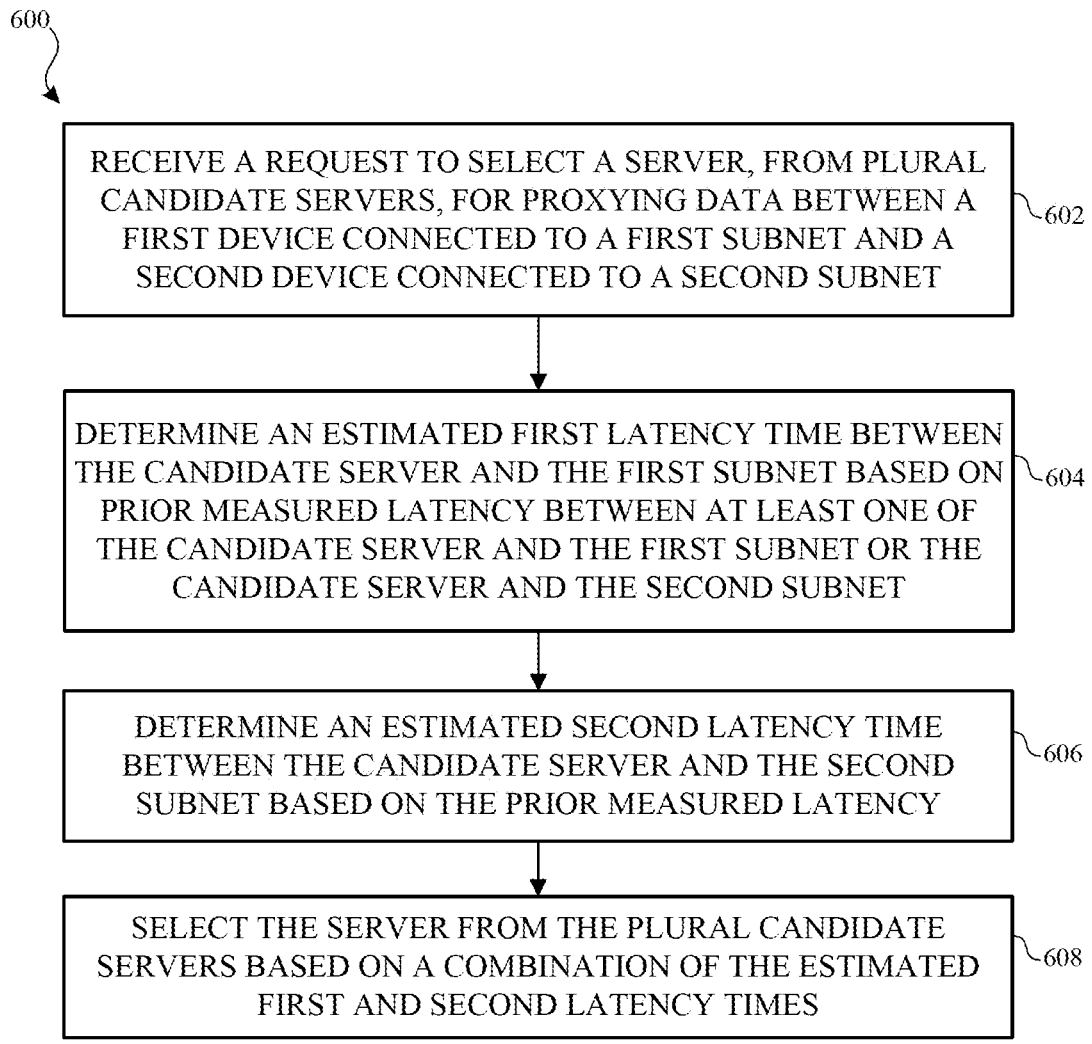
FIG. 6 illustrates a flow diagram of example process for selecting a server to proxy data between multiple devices in accordance with one or more implementations.

FIG. 6 illustrates a flow diagram of an example process for selecting a proxy server 108*a* for proxying data between multiple devices in accordance with one or more implementations. For explanatory purposes, the process 600 is primarily described herein with reference to the electronic devices 102*a*-102*c*, the allocation server 106 and the server proxy server 108*a* of FIG. 1. However, the process 600 is not limited to the electronic devices 102*a*-102*c*, the allocation server 106 and the server proxy server 108*a* of FIG. 1, and one or more blocks (or operations) of the process 600 may be performed by one or more other components and/or other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

At operation 602, the allocation server 106 receives a request to select a server (e.g., the proxy server 108*a*), from plural candidate servers (e.g., the proxy servers 108*a*-108*d*), for proxying data between a first device (e.g., the electronic device 102*a*) connected to a first subnet (e.g., the subnet 302*a*) and a second device (e.g., the electronic device 102*b*) connected to a second subnet (e.g., the subnet 302*a*).

For each of the candidate servers (e.g., the proxy servers 108*a*-108*d*), the allocation server 106 determines an estimated first latency time between the candidate server and the subnet 302*a* based on prior measured/estimated latency between at least one of the candidate server and the subnet 302*a* or the candidate server and the subnet 302*b* (604). The allocation server 106 determines an estimated second latency time between the candidate server and the subnet 302*b* based on the prior measured/estimated latency (606). Determining the estimated first and second latency times may include retrieving the estimated first and second latency times from a data structure (e.g., generated by the data structure generation server 107) that stores the estimated first and second latency times.

In one or more implementations, the prior measured latency may be between the candidate server and the subnet 302*a* and also between the candidate server and the subnet 302*b*. In such a case, the estimated first and second latency times may respectively correspond to the prior measured latencies between the candidate server and the subnet 302*a* and between the candidate server and the subnet 302*b*.

Alternatively or in addition, the prior measured/estimated latency may be between the candidate server and the subnet 302*a*, with no prior measured latency (e.g., or an insufficient predefined amount of latency measurements) between the candidate server and the subnet 302*b*. In such a case, the estimated first latency time may correspond to the prior measured latency between the candidate server and the subnet 302*a*.

However, the estimated second latency time may correspond to output from a machine learning model configured to output a predicted latency between the subnet 302*b* and the candidate server, based at least in part on the prior measured latency between the candidate server and the subnet 302*a*. The machine learning model may have been trained with a training dataset that includes the prior measured latency with respect to the candidate server and the subnet 302*a*, and geographic data of the candidate server and the subnet 302*a*, e.g., in addition to other measured latencies and corresponding geographic data. The allocation server 106 selects the server (e.g., the proxy server 108*a*) from the plural candidate servers (e.g., the proxy servers 108*a*-108*d*) based on a summation of the estimated first and second latency times (608).

In one or more implementations, the request to select the proxy server may be a request for proxying data between three or more devices. For example, the request may be for proxying data between the electronic device 102*a*, the electronic device 102*b* and the electronic device 102*c* (e.g., connected to the subnet 302*c*). The allocation server 106 may determine, for each of the plural candidate servers (e.g., the proxy servers 108*a*-108*d*), an estimated third latency time between the candidate server and the subnet 302*c* based on the prior measured latency, the prior measured latency being between at least one of the candidate server and the subnet 302*a*, the candidate server and the subnet 302*b*, or the candidate server and the subnet 302*c*. Selecting the server from the plural candidate servers may be based on a summation of the estimated first, second and third latency times.

Figure 7:
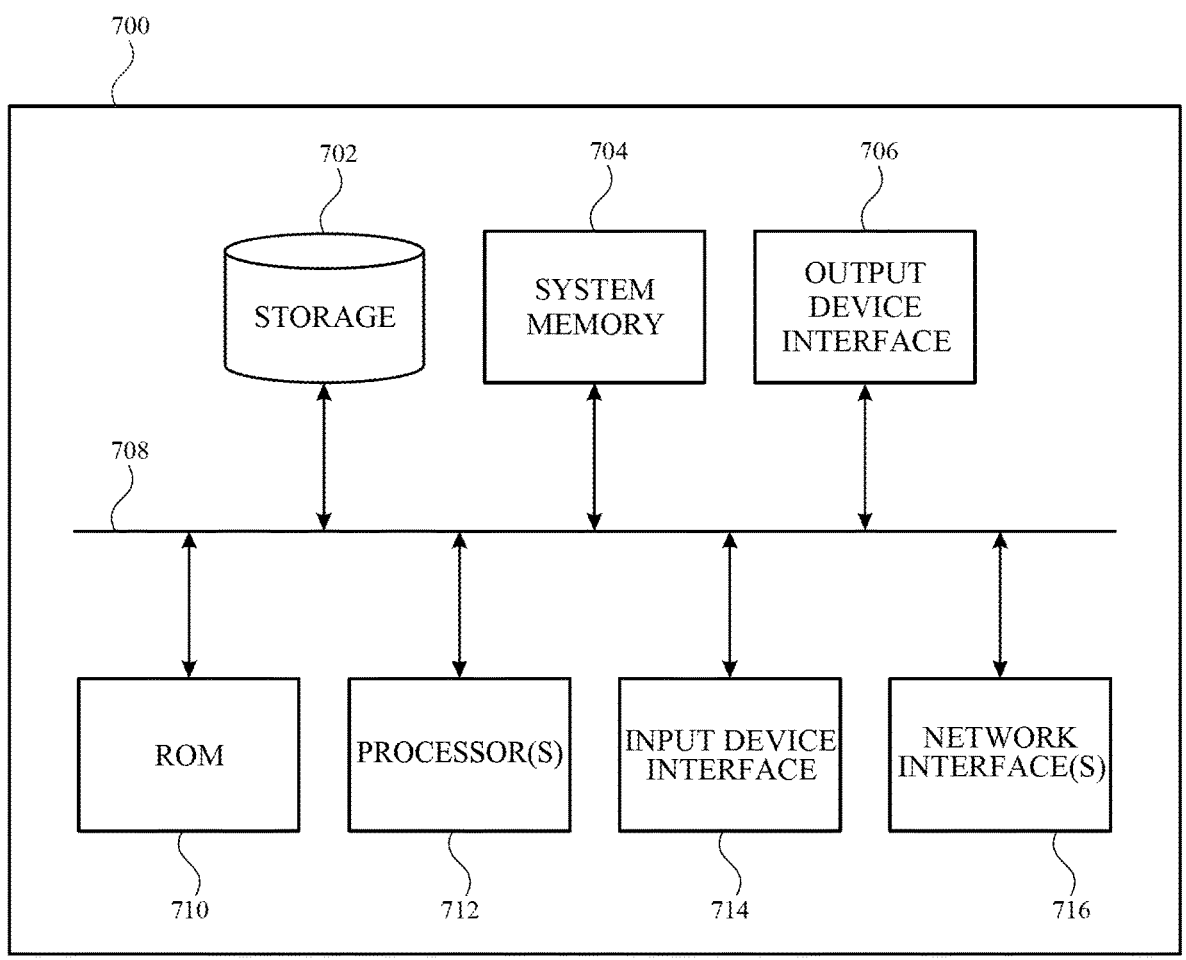
FIG. 7 illustrates an example electronic system with which aspects of the subject technology may be implemented in accordance with one or more implementations.

FIG. 7 illustrates an electronic system 700 with which one or more implementations of the subject technology may be implemented. The electronic system 700 can be, and/or can be a part of, one or more of the electronic devices 102a-102c, the allocation server 106 and/or the proxy servers 108a-108d of shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the allocation server 106 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    obtaining a first latency and a second latency, the first latency being between a server and a first subnet, and the second latency being between the server and a second subnet;
    training a machine learning model with a training dataset that includes the first latency with respect to the server and the first subnet, the second latency with respect to the server and the second subnet, and geographic data of: the server, the first subnet and the second subnet;
    using the machine learning model to estimate a third latency between the server and a third subnet; and
    storing the third latency in a data structure,
    wherein devices are respectively connected to at least one of the first, second or third subnets, and the data structure is used by an allocation server to select the server, from among plural candidate servers and in response to receiving a proxy request, for proxying data between the devices based at least on the third latency stored within the data structure.

2. The method of claim 1, wherein each of the first and second latencies correspond to a round trip time between the server and the first and second subnets, respectively.

3. The method of claim 1, further comprising:
using the machine learning model to estimate a fourth latency between a second server and one of the first, second or third subnets; and
storing the fourth latency in the data structure.

4. The method of claim 1, wherein the machine learning model is used to estimate the third latency between the server and the third subnet based at least in part on geographic data of the third subnet.

5. The method of claim 1, wherein proxying the data between the devices corresponds to audio-video conferencing between the devices.

6. A device, comprising:
a memory; and
at least one processor configured to:
obtain a first latency and a second latency, the first latency being between a server and a first subnet, and the second latency being between the server and a second subnet;
train a machine learning model with a training dataset that includes the first latency with respect to the server and the first subnet, the second latency with respect to the server and the second subnet, and geographic data of: the server, the first subnet and the second subnet; and
use the machine learning model to estimate a third latency between the server and a third subnet; and
store the first, second and third latencies in a data structure,
wherein devices are respectively connected to at least one of the first, second or third subnets, and the data structure is used by an allocation server to select the server, from among plural candidate servers and in response to receiving a proxy request, for proxying data communicated between the devices based on at least the third latency stored within the data structure.

7. The device of claim 6, wherein each of the first and second latencies correspond to a round trip time between the server and the first and second subnets, respectively.

8. The device of claim 6, wherein the at least one processor is further configured to:
use the machine learning model to
estimate a fourth latency between a second server and one of the first, second or third subnets, and
estimate a fifth latency between a third server and one of the first, second or third subnets; and
store the fourth latency and the fifth latency in the data structure.

9. The device of claim 6, wherein the machine learning model is used to estimate the third latency between the server and the third subnet based on geographic data of the third subnet.

10. The device of claim 8, wherein the data communicated between the devices corresponds to audio-video conferencing data.

11. A computer program product comprising code, stored in a non-transitory computer-readable storage medium, the code comprising:

code to receive a request to select a server, from plural candidate servers, for proxying data between a first device connected to a first subnet and a second device connected to a second subnet;
code to, for each of the plural candidate servers,
determine an estimated first latency time between the candidate server and the first subnet based on prior measured latency between at least one of the candidate server and the first subnet or the candidate server and the second subnet;
determine an estimated second latency time between the candidate server and the second subnet based on the prior measured latency; and
select the server from the plural candidate servers based on a summation of the estimated first and second latency times.

12. The computer program product of claim 11, wherein the prior measured latency is between the candidate server and the first subnet and between the candidate server and the second subnet, and
wherein the estimated first and second latency times respectively correspond to the prior measured latencies between the candidate server and the first subnet and between the candidate server and the second subnet.

13. The computer program product of claim 11, wherein the prior measured latency is between the candidate server and the first subnet,
wherein the estimated first latency time corresponds to the prior measured latency between the candidate server and the first subnet, and
wherein the estimated second latency time corresponds to output from a machine learning model configured to output a predicted latency between the second subnet and the candidate server, based at least in part on the prior measured latency between the candidate server and the first subnet.

14. The computer program product of claim 13, the machine learning model having been trained with a training dataset that includes the prior measured latency with respect to the candidate server and the first subnet, and geographic data of the server and the first subnet.

15. The computer program product of claim 11, wherein the code to determine the estimated first and second latency times comprises code to retrieve the estimated first and second latency times from a data structure that stores the estimated first and second latency times.

16. The computer program product of claim 11, wherein the request is for proxying data between the first device, the second device and a third device connected to a third subnet,
wherein the code further comprises code to determine, for each of the plural candidate servers, an estimated third latency time between the candidate server and the third subnet based on the prior measured latency, the prior measured latency being between at least one of the candidate server and the first subnet, the candidate server and the second subnet, or the candidate server and the third subnet, and
wherein selection of the server from the plural candidate servers is based on a summation of the estimated first, second and third latency times.

17. The method of claim 1, further comprising storing the first latency and the second latency in the data structure.

18. The method of claim 17, wherein the data structure is used by the allocation server to select the server, from among the plural candidate servers, based on a summation of the third latency and at least one of the first latency and the second latency.

19. The method of claim 18, wherein the devices comprise at least a first device connected to the first subnet and a second device connected to the second subnet.

20. The device of claim 6, wherein the data structure is used by the allocation server to select the server, from among the plural candidate servers, based on a summation of the third latency and at least one of the first latency and the second latency.

* * * * *